Figure 1:
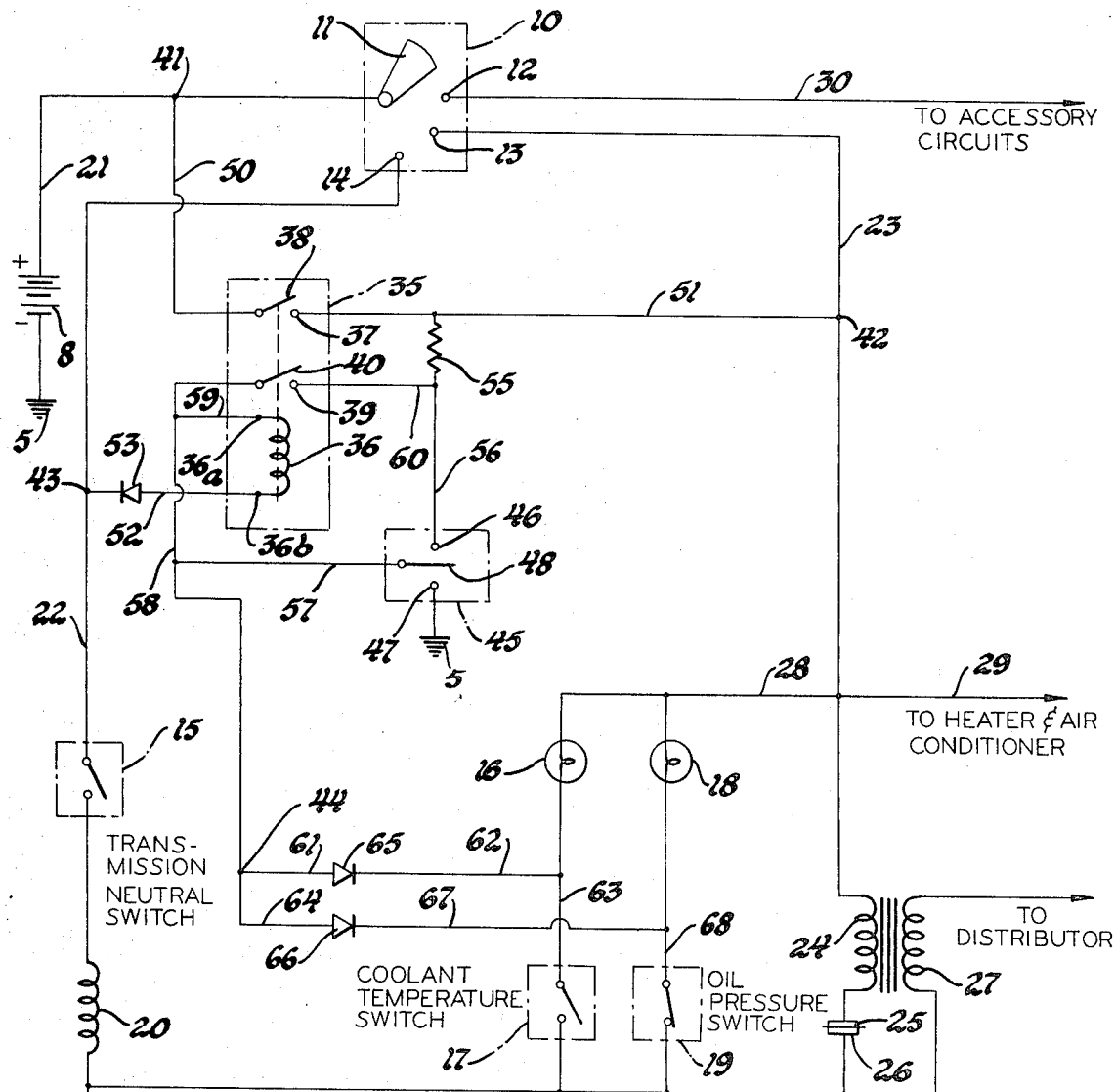

United States Patent [19]

Ballou

[11] 3,766,398
[45] Oct. 16, 1973

[54] SYSTEM FOR OPERATING AN UNATTENDED AUTOMOBILE ENGINE
[75] Inventor: Richard P. Ballou, Howell, Mich.
[73] Assignee: General Motors Corporation, Detroit, Mich.
[22] Filed: June 15, 1972
[21] Appl. No.: 262,962

[52] U.S. Cl. .................................. 290/38, 290/37
[51] Int. Cl. ............................................ H02p 9/04
[58] Field of Search........................ 290/33, 37, 38; 123/179

[56] References Cited
UNITED STATES PATENTS
3,587,545   6/1971   Ballou................................ 290/38
3,675,032   7/1972   Shaheen........................... 290/38 C Primary Examiner—G. R. Simmons
Attorney—Eugene W. Christen et al.

[57] ABSTRACT

A system for operating an unattended automobile engine. The normally open contacts of an electrical relay are connected in shunt across the movable contact and stationary ignition circuit contact of the ignition switch. The relay operating coil is energizable upon the operation of the ignition switch to the "Crank" and/or "Run" position and is maintained energized upon the operation of the ignition switch to the "Off" position through the relay contacts connected in shunt across the contacts of the ignition switch. The relay operating coil may be shunted by a normally open selector switch when it is desired to turn off the ignition system of the engine and is shunted by the normally open coolant temperature tell-tale lamp switch and the normally closed oil pressure tell-tale lamp switch to automatically turn off the ignition system of the engine in the event of overheating or loss of oil pressure.

5 Claims, 3 Drawing Figures

SYSTEM FOR OPERATING AN UNATTENDED AUTOMOBILE ENGINE

This invention is directed to a system for operating an unattended automobile engine and, more specifically, to a system of this type which permits the operation of the automobile engine with the ignition switch in the "Off" position and provides manual turnoff of the engine ignition circuit and automatic turnoff of the engine ignition circuit in the event the transmission is shifted to any position except "Park" or the engine overheats or loses oil pressure.

On many occasions it is desirable to operate the engine of an unattended automobile while the vehicle is locked without danger of theft or engine damage. The primary applications would be for heating the automobile during cold weather, for air conditioning the automobile during warm weather, or for permitting the engine to operate to charge the battery while unattended.

It is, therefore, an object of this invention to provide an improved system for operating an unattended automobile engine.

It is another object of this invention to provide an improved system for operating an unattended automobile engine while the ignition switch is in the "Off" or "Lock" position.

It is an additional object of this invention to provide an improved system for operating an unattended automobile engine while the ignition switch is in the "Lock" or "Off" position and which provides for the manual turnoff of the engine ignition circuit when desired and for the automatic turnoff of the engine ignition circuit in the event the transmission is shifted to any position except the "Park" position or the engine overheats or loses oil pressure.

In accordance with this invention, a system for operating an unattended automobile engine is provided wherein the normally open contacts of an electrical relay are connected in shunt across the movable contact and stationary ignition circuit contact of the ignition switch with the relay operating coil, connected in series with the transmission neutral switch across the battery, energizable upon the operation of the ignition switch to the "Crank" and/or "Run" position, maintained energized upon the operation of the ignition switch to the "Off" position through the stationary and movable contacts of the relay shunted manually by a normally open selector switch to manually turn off the ignition circuit of the engine and shunted by the normally open coolant temperature tell-tale lamp switch and the normally closed oil pressure tell-tale lamp switch to automatically turn off the ignition circuit of the engine in the event of overheating or loss of oil pressure.

Figure 2:
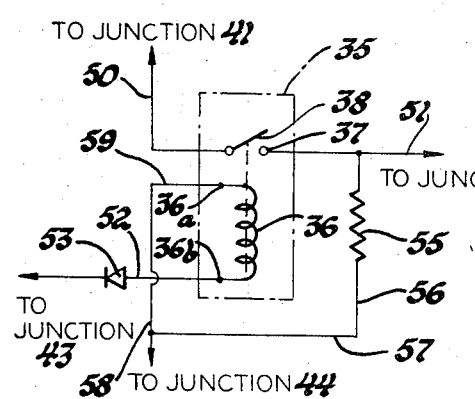
Figure 3:
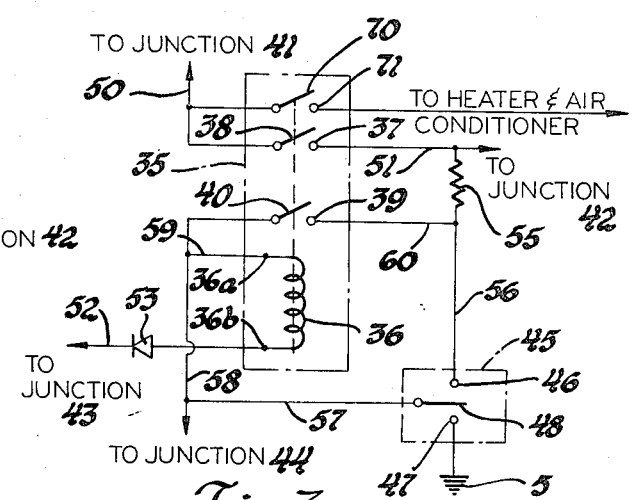

For a better understanding of the present invention, together with additional objects, advantages and features thereof, reference is made to the following description and accompanying drawing in which:

FIG. 1 schematically sets forth the system of this invention for operating an unattended automobile engine with a selector switch feature which provides for the selective energization and deenergization of the system;

FIG. 2 schematically sets forth the system of this invention which is automatically energized upon the operation of the ignition switch to the "Run" position and is deenergized automatically upon the shifting of the transmission to any position except the "Neutral" or "Park" position; and FIG. 3 sets forth schematically the system of this invention which provides an auxiliary set of relay contacts through which the heater and air conditioning equipment may be energized.

In the FIGURES of the drawing, like elements have been assigned like characters of reference.

As the point of reference or ground potential is the same point electrically throughout the system, it has been represented in FIG. 1 by the accepted schematic symbol and referenced by the numeral 5.

Referring to FIG. 1 of the drawing, the system for operating an unattended automobile engine of this invention is set forth in combination with an ignition switch 10 having a movable contact 11 and a stationary ignition circuit contact 13, a transmission neutral switch 15, a normally open coolant temperature tell-tale light switch 17, a normally closed oil pressure tell-tale light switch 19 and a direct current potential source having positive and negative polarity terminals, which may be a battery 8.

Ignition switch 10 may be any conventional automotive type ignition switch having an open or "Off" position, in which position it is illustrated in FIG. 1, a "Run" position, at which movable contact 11 is closed to accessory circuit stationary contact 12 and ignition circuit stationary contact 13, and a "Crank" position, at which movable contact 11 is closed to ignition circuit stationary contact 13 and cranking circuit stationary contact 14. As is well known in the automotive art, ignition switches of this type are spring biased to automatically return to the "Run" position wherein movable contact 11 is closed to accessory circuit stationary contact 12 and ignition circuit stationary contact 13 when the torque applied to the ignition key is released upon engine start. The transmission neutral switch 15 may be a conventional automotive type transmission neutral switch having a movable contact which is operated to the electrical circuit closed condition with a stationary contact while the transmission is shifted into the "Park" or "Neutral" position and to the electrical circuit open condition in any other transmission position, coolant temperature tell-tale light switch 17 may be a conventional automotive type coolant temperature switch having two normally open temperature sensitive contacts which operate to the electrical circuit closed condition when the coolant temperature reaches a predetermined magnitude and oil pressure tell-tale light switch 19 may be a conventional automotive type oil pressure switch having two normally closed pressure sensitive contacts which are operated to the electrical circuit open condition by normal engine lubricating oil pressure. All of these three switches are commercially available items well known in the art which are installed upon all modern automobiles.

Upon the operation of movable contact 11 of ignition switch 10 to the "Crank" position with the transmission in the "Park" or "Neutral" position, cranking motor solenoid 20 is energized by battery 8 through lead 21, movable contact 11 and cranking circuit stationary contact 14 of ignition switch 10, lead 22, transmission neutral switch 15, cranking motor solenoid 20 and point of reference or ground potential 5; the ignition circuit is completed across battery 8 through lead 21, movable contact 11 and ignition circuit stationary contact 13 of ignition switch 10, lead 23, ignition coil primary winding 24, ignition distributor breaker contacts 25 and 26 and point of reference or ground potential 5 and battery 8 potential is applied to the coolant temperature tell-tale lamp 16 and the oil pressure tell-tale lamp 18 through lead 28 and to the heater and air conditioner circuit through lead 29. The ignition distributor breaker contacts 25 and 26 are operated to the electrical circuit open and closed conditions in timed relationship with the engine, not shown, in a manner well known in the automotive art to provide ignition signal pulses in the ignition coil secondary winding 27. Upon engine start and the operation of movable contact 11 of ignition switch 10 to the "Run" position, the energizing circuit for cranking motor solenoid 20 is interrupted, battery 8 potential is maintained upon the tell-tale lamps and heater and air conditioner circuit and battery 8 potential is applied to the accessory circuit through lead 30. This portion of FIG. 1 is old and well known in the automotive art and, per se, forms no part of this invention.

The system of this invention for operating an unattended automobile engine is comprised of a two-pole, single-throw relay 35 having an operating coil 36, two stationary contacts 37 and 39 and two movable contacts 38 and 40, each corresponding to one of the stationary contacts, operable to the electrical circuit closed position upon the energization of operating coil 36 and a manually operable single pole, double-throw selector switch 45 having two stationary contacts 46 and 47 and a movable contact 48 having a center electric circuit open position, in which position it is illustrated in FIG. 1, and operable to the electric circuit closed position with each of stationary contacts 46 and 47.

Movable contact 38 and stationary contact 37 of relay 35 are connected in shunt across the movable contact 11 and the stationary ignition circuit contact 13 of ignition switch 10 through junction 41 and lead 50 and through lead 51, junction 42 and lead 23.

One end of the relay operating coil 36 is connected to a selected polarity terminal of the direct current potential source through the transmission neutral switch. In FIG. 1, and without intention or inference of a limitation thereto, end 36b of relay operating coil 36 is connected to the negative polarity terminal of battery 8 through lead 52, forward poled diode 53, junction 43, lead 22, transmission neutral switch 15, cranking motor solenoid 20 and point of reference or ground potential 5.

The other end of relay operating coil 36 is connected to the other polarity terminal of the direct current potential source through first and second circuits. In FIG. 1, and without intention or inference of a limitation thereto, end 36a of relay operating 36 is connected to the positive polarity terminal of battery 8 through a first circuit which may be traced from the positive polarity terminal of battery 8, through lead 21, movable contact 11 and ignition circuit stationary contact 13 of ignition switch 10, leads 23 and 51, current limiting resistor 55, lead 56, stationary contact 46 and movable contact 48 of selector switch 45 and leads 57, 58 and 59 and through a second circuit which may be traced from the positive polarity terminal of battery 8 through leads 21 and 50, movable contact 38 and stationary contact 37 of relay 35, resistor 55, lead 60, stationary contact 39 and corresponding movable contact 40 of relay 35 and leads 58 and 59.

The movable contact and the other one of the stationary contacts of selector switch 45 are connected in shunt across relay operating coil 36 through a circuit which may be traced from end 36a of relay operating coil 36, through leads 59, 58 and 57, movable contact 48 and stationary contact 47 of selector switch 45 and point of reference or ground potential 5.

The series combination of a forward poled diode 65 and the normally open coolant temperature tell-tale light switch 17 is connected in shunt across relay operating coil 36 through a circuit which may be traced from end 36a of relay operating coil 36 through leads 59 and 58, junction 44, lead 61, forward poled diode 65, leads 62 and 63, coolant temperature switch 17 and point of reference or ground potential 5.

The series combination of forward poled diode 66 and the normally closed oil pressure tell-tale light switch 19 is connected in shunt across relay operating coil 36 through a circuit which may be traced from end 36a of relay operating coil 36, through leads 59 and 58, junction 44, lead 64, forward poled diode 66, leads 67 and 68, oil pressure tell-tale light switch 19 and point of reference or ground potential 5.

With the engine running and the transmission shifted to the "Park" or "Neutral" position, movable contact 11 of ignition switch 10 is closed to the ignition circuit stationary contact 13. Upon the operation of movable contact 48 of selector switch 45 into electrical contact with stationary contact 46, relay operating coil 36 is energized by battery 8 through a circuit which may be traced from the positive polarity terminal of battery 8, through lead 21, movable contact 11 and ignition circuit stationary contact 13 of ignition switch 10, leads 23 and 51, resistor 55, lead 56, stationary contact 46 and movable contact 48 of selector switch 45, leads 57, 58 and 59, relay operating coil 36, lead 52, forward poled diode 53, junction 43, lead 22, transmission neutral switch 15, low resistance cranking motor solenoid 20 and point of reference or ground potential 5 to the negative polarity terminal of battery 8. The energization of relay operating coil 36 operates movable contacts 38 and 40 into electrical contact with corresponding stationary contacts 37 and 39, respectively. Movable contact 38 and stationary contact 37 provide a shunt circuit across movable contact 11 and ignition circuit stationary contact 13 of ignition switch 10 and, with stationary contact 39 and movable contact 40 of relay 35, establish an alternate energizing circuit for relay operating coil 36 which bypasses selector switch 45 which may be traced from the positive polarity terminal of battery 8, through lead 21, junction 41, lead 50, movable contact 38 and stationary contact 37 of relay 35, resistor 55, lead 60, stationary contact 39 and movable contact 40 of relay 35, leads 58 and 59, relax operating coil 36, lead 52, forward poled diode 53, junction 43, lead 22, transmission neutral switch 15, low resistance cranking motor solenoid 20 and point of reference or ground potential 5 to the negative polarity terminal of battery 8. Consequently, upon the energization of relay 35, the ignition switch 10 may be operated to the "Off" position and the ignition key withdrawn and the engine ignition circuit, the tell-tale lamp circuits and the heater and air conditioner circuit are maintained through leads 21 and 50, movable contact 38 and stationary contact 37 of relay 35 and leads 51, 23, 28 and 29. The engine, therefore, will continue to run and the heater and/or air conditioner will operate, provided the individual switch which energizes each of these respective devices is in the electrical circuit closed condition.

In the event the transmission lever should be shifted out of the "Park" or "Neutral" position, the transmission neutral switch 15 will interrupt the energizing circuit for relay operating coil 36 to deenergize this relay. Upon the deenergization of relay 35, the ignition circuit and the tell-tale lamp and heater and air conditioner circuits are interrupted by movable contact 38 moving out of electrical contact with stationary contact 37 of relax 35, a condition which turns off the engine ignition circuit to stop the engine.

In the event the coolant temperature should reach a predetermined maximum magnitude, the normally open contacts of coolant temperature switch 17 will be operated to the electrical circuit closed condition to provide a low resistance shunt circuit across relay operating coil 36 and should the engine lose oil pressure, the normally closed contacts of oil pressure switch 19 will operate to the electrical circuit closed condition to also provide a low resistance shunt circuit across relay operating coil 36. Upon the closure of either the coolant temperature switch 17 or the coil pressure switch 19, operating coil 36 of relay 35 becomes deenergized and, consequently, movable contact 38 moves out of electrical contact with stationary contact 37 to interrupt the ignition, tell-tale lamp and heater and air condition circuits.

Diode 53 is inserted in series with relay operating coil 36 and transmission neutral switch 15 to prevent the energization of relay operating coil 36 by a reverse power flow therethrough during engine cranking through diode 66 and the oil pressure switch 19 to point of reference or ground potential 5.

Diodes 65 and 66 isolate the coolant temperature switch tell-tale lamp and oil pressure switch tell-tale lamp circuits from each other.

If desired, diode 65 may be omitted, a condition which will permit the checking of the coolant temperature tell-tale lamp 16 upon starting, as ground therefor will be supplied through diode 66 and the oil pressure switch 19.

The circuit may be made completely automatic by eliminating selector switch 45 and movable contact 40 and stationary contact 39 of relay 35 so that resistor 55 is connected directly to end 36a of relay operating coil 36 through leads 56, 57, 58 and 59 as shown in FIG. 2, which schematically sets forth only this portion of the circuit. With this modification, relay operating coil 36 will be energized whenever the engine is running and the transmission is shifted to the "Park" or "Neutral" positions. To allow the engine to remain running, the transmission is shifted to the "Park" position before the ignition switch 10 is operated to its "Off" position. To stop the engine, the ignition switch 10 is operated to the "Off" position before the transmission is shifted into the "Park" position.

On some recent model year automobiles, the heater and air conditioner circuit is not supplied through the movable contact and ignition circuit stationary contact of the ignition switch but is supplied by an additional circuit within the ignition switch so that these accessories are disconnected during engine cranking. With automobiles of this type, an additional movable contact 70 and an additional corresponding stationary contact 71 may be added to relay 35 to complete an energizing circuit for the heater and air conditioner while the ignition switch is in the "Run" position, as schematically shown in FIG. 3.

While this specification has indicated the negative polarity terminal battery 8 to be connected to point of reference or ground potential 5, it is to be specifically understood that the circuit of this invention is equally applicable with systems in which the positive polarity terminal of the battery is connected to point of reference or ground potential 5.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A system for operating an unattended automobile engine comprising in combination with an ignition switch having a movable contact and a stationary ignition circuit contact, a transmission neutral switch, a normally open coolant temperature tell-tale light switch, a normally closed oil pressure tell-tale light switch and a direct current potential source having positive and negative polarity terminals; a relay having an operating coil and at least one stationary contact and a corresponding movable contact, operable to the electrical circuit closed position upon the energization of said operating coil, connected in shunt across said movable contact and said stationary ignition circuit contact of said ignition switch; a resistor; means for connecting one end of said relay operating coil to a selected polarity terminal of said direct current potential source through said transmission neutral switch; first circuit means for connecting the other end of said relay operating coil to the other polarity terminal of said direct current potential source through said movable contact and said stationary ignition circuit contact of said ignition switch and said resistor; second circuit means for connecting the said other end of said relay operating coil to the said other polarity terminal of said direct current potential source through said stationary contact and the said movable contact of said relay and said resistor; means for connecting said normally open coolant temperature tell-tale light switch in shunt across said relay operating coil; and means for connecting said normally closed oil pressure tell-tale light switch in shunt across said relay operating coil.

2. A system for operating an unattended automobile engine comprising in combination with an ignition switch having a movable contact and a stationary ignition circuit contact, a transmission neutral switch, a normally open coolant temperature tell-tale light switch, a normally closed oil pressure tell-tale light switch and a direct current potential source having positive and negative polarity terminals; a relay having an operating coil and at least one stationary contact and a corresponding movable contact, operable to the electrical circuit closed position upon the energization of said operating coil, connected in shunt across said movable contact and said stationary ignition circuit contact of said ignition switch; a resistor; a first diode; means for connecting one end of said relay operating coil to a selected polarity terminal of said direct current potential source through said first diode and said transmission neutral switch in series; first circuit means for connecting the other end of said relay operating coil to the other polarity terminal of said direct current potential source through said movable contact and said stationary ignition circuit contact of said ignition switch and said resistor; second circuit means for connecting the said other end of said relay operating coil to the said other polarity terminal of said direct current potential source through said stationary contact and the said movable contact of said relay and said resistor; second and third diodes; means for connecting the series combination of said second diode and said normally open coolant temperature tell-tale light switch in shunt across said operating coil; and means for connecting the series combination of said third diode and said normally closed oil pressure tell-tale light switch in shunt across said relay operating coil.

3. A system for operating an unattended automobile engine comprising in combination with an ignition switch having a movable contact and a stationary ignition circuit contact, a transmission neutral switch, a normally open coolant temperature tell-tale light switch, a normally closed oil pressure tell-tale light switch and a direct current potential source having positive and negative polarity terminals; a two-pole single-throw relay having an operating coil, two stationary contacts and two movable contacts, each corresponding to one of said stationary contacts, operable to the electrical circuit closed position upon the energization of said operating coil; means for connecting one of said stationary contacts and one of said movable contacts of said relay in shunt across said movable contact and said stationary ignition circuit contact of said ignition switch; a single-pole double-throw selector switch having two stationary contacts and a movable contact having a center electric circuit open position and operable to the electrical closed position with each of said stationary contacts; a resistor; means for connecting one end of said relay operating coil to a selected polarity terminal of said direct current potential source through said transmission neutral switch; first circuit means for connecting the other end of said relay operating coil to the other polarity terminal of said direct current potential source through said movable contact and said stationary ignition circuit contact of said ignition switch, said resistor and one of said stationary contacts and said movable contact of said selector switch in series; second circuit means for connecting the said other end of said relay operating coil to the said other polarity terminal of said direct current potential source through the said one of said stationary contacts and the corresponding said movable contact of said relay connected in shunt across said movable contact and said stationary ignition contact of said ignition switch, said resistor and the other one of said stationary contacts and the corresponding said movable contact of said relay in series; means for connecting said movable contact and the other one of said stationary contacts of said selector switch in shunt across said relay operating coil; means for connecting said normally open coolant temperature tell-tale light switch in shunt across said relay operating coil; and means for connecting said normally closed oil pressure tell-tale light switch in shunt across said relay operating coil.

4. A system for operating an unattended automobile engine comprising in combination with an ignition switch having a movable contact and a stationary ignition circuit contact, a transmission neutral switch, a normally open coolant temperature tell-tale light switch, a normally closed oil pressure tell-tale light switch and a direct current potential source having positive and negative polarity terminals; a two-pole single-throw relay having an operating coil, two stationary contacts and two movable contacts, each corresponding to one of said stationary contacts, operable to the electrical circuit closed position upon the energization of said operating coil; means for connecting one of said stationary contacts and one of said movable contacts of said relay in shunt across said movable contact and said stationary ignition circuit contact of said ignition switch; a single-pole double-throw selector switch having two stationary contacts and a movable contact having a center electric circuit open position and operable to the electrical closed position with each of said stationary contacts; a resistor; a first diode; means for connecting one end of said relay operating coil to a selected polarity terminal if said direct current potential source through said first diode and said transmission neutral switch in series; first circuit means for connecting the other end of said relay operating coil to the other polarity terminal of said direct current potential source through said movable contact and said stationary ignition circuit contact of said ignition switch, said resistor and one of said stationary contacts and said movable contact of said selector switch in series; second circuit means for connecting the said other end of said relay operating coil to the said other polarity terminal of said direct current potential source through said one of said stationary contacts and the corresponding said movable contact of said relay, said resistor and the other one of said stationary contacts and the corresponding said movable contact of said relay in series; means for connecting said movable contact and the other one of said stationary contacts of said selector switch in shunt across said relay operating coil; second and third diodes; means for connecting the series combination of said second diode and said normally open coolant temperature tell-tale light switch in shunt across said relay operating coil; and means for connecting the series combination of said third diode and said normally closed oil pressure tell-tale light switch in shunt across said relay operating coil.

5. A system for operating an unattended automobile engine comprising in combination with an ignition switch having a movable contact and a stationary ignition circuit contact, a transmission neutral switch, a normally open coolant temperature tell-tale light switch, a normally closed oil pressure tell-tale light switch and a direct current potential source having positive and negative polarity terminals, one of which is connected to a point of reference or ground potential; a two-pole single-throw relay having an operating coil, two stationary contacts and two movable contacts, each corresponding to one of said stationary contacts, operable to the electrical circuit closed position upon the energization of said operating coil; means for connecting one of said stationary contacts and one of said movable contacts of said relay in shunt across said movable contact and said stationary ignition circuit contact of said ignition switch; a single-pole double-throw selector switch having two stationary contacts and a movable contact having a center electric circuit open position and operable to the electrical closed position with each of said stationary contacts; a resistor; a first diode; means for connecting one end of said relay operating coil to said point of reference or ground potential through said first diode and said transmission neutral switch in series; first circuit means for connecting the other end of said relay operating coil to the ungrounded polarity terminal of said direct current potential source through said movable contact and said stationary ignition circuit contact of said ignition switch, said resistor and one of said stationary contacts and said movable contact of said selector switch in series; second circuit means for connecting the said other end of said relay operating coil to the ungrounded polarity terminal of said direct current potential source through said one of said stationary contacts and the corresponding said movable contact of said relay, said resistor and the other one of said stationary contacts and the corresponding said movable contact of said relay in series; means for connecting said movable contact and the other one of said stationary contacts of said selector switch in shunt across said relay operating coil; second and third diodes; means for connecting the series combination of said second diode and said normally open coolant temperature tell-tale light switch in shunt across said relay operating coil; and means for connecting the series combination of said third diode and said normally closed oil pressure tell-tale light switch in shunt across said relay operating coil.

* * * * *